US011259460B2

(12) United States Patent
Parson et al.

(10) Patent No.: US 11,259,460 B2
(45) Date of Patent: Mar. 1, 2022

(54) CENTER DRIVE FOR SICKLE KNIFE

(71) Applicant: Macdon Industries Ltd., Winnipeg (CA)

(72) Inventors: Kenneth Parson, Winnipeg (CA); Don MacGregor, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 120 days.

(21) Appl. No.: 16/739,855

(22) Filed: Jan. 10, 2020

(65) Prior Publication Data

US 2020/0187413 A1 Jun. 18, 2020

Related U.S. Application Data

(63) Continuation-in-part of application No. PCT/CA2018/050780, filed on Jun. 26, 2018.

(60) Provisional application No. 62/530,435, filed on Jul. 10, 2017.

(51) Int. Cl.
*A01D 34/30* (2006.01)
*A01D 34/14* (2006.01)
*A01D 34/38* (2006.01)

(52) U.S. Cl.
CPC .............. *A01D 34/30* (2013.01); *A01D 34/14* (2013.01); *A01D 34/38* (2013.01)

(58) Field of Classification Search
CPC .......... A01D 34/14; A01D 34/30; A01D 34/38
See application file for complete search history.

(56) References Cited

U.S. PATENT DOCUMENTS

| 4,866,921 A  | * | 9/1989 | Nagashima | A01D 34/30 56/257 |
| 6,889,492 B1 | * | 5/2005 | Polk | A01D 34/30 56/257 |
| 10,212,884 B2 | † | 2/2019 | Webermann | |
| 10,412,891 B2 | * | 9/2019 | Joyce | A01D 61/002 |
| 10,721,862 B2 | * | 7/2020 | Bich | A01D 34/145 |
| 10,827,673 B2 | * | 11/2020 | Cook | A01D 34/32 |
| 2009/0145096 A1 | * | 6/2009 | Priepke | A01D 41/142 56/257 |
| 2009/0145264 A1 | * | 6/2009 | Priepke | A01D 34/30 74/84 R |
| 2015/0305233 A1 | * | 10/2015 | Surmann | A01D 34/145 56/10.1 |
| 2017/0094898 A1 | * | 4/2017 | Schumacher | F16H 37/12 |
| 2017/0127611 A1 | * | 5/2017 | Dunn | A01D 34/38 |
| 2018/0007827 A1 | * | 1/2018 | Talbot | A01D 34/18 |
| 2019/0053424 A1 | * | 2/2019 | Talbot | A01D 34/17 |
| 2019/0053425 A1 | * | 2/2019 | Talbot | A01D 34/16 |
| 2019/0090418 A1 | * | 3/2019 | Cook | A01D 34/30 |

(Continued)

*Primary Examiner* — Abigail A Risic
(74) *Attorney, Agent, or Firm* — Miller Canfield

(57) ABSTRACT

The cutter bar of a header including two sickle bars is driven by a center drive system including a rotary input drive member driven by a motor, first and second rotary members each driven by the drive member about a generally upstanding first rotational axis. Each of the rotary members has an eccentric drive system for driving a respective sickle bar. A flywheel is driven by the rotary input drive member for common rotation therewith and the first and second rotary members are driven by a common drive sprocket to rotate in the same direction about the first and second rotary axes.

33 Claims, 14 Drawing Sheets

(56) References Cited

U.S. PATENT DOCUMENTS

| | | | |
|---|---|---|---|
| 2019/0124830 A1* | 5/2019 | DeChristopher | A01D 34/30 |
| 2019/0357438 A1* | 11/2019 | Zumbach | A01D 34/135 |
| 2020/0260641 A1* | 8/2020 | Schmidt | A01D 34/14 |
| 2021/0045288 A1* | 2/2021 | Sorensen | A01D 34/30 |

\* cited by examiner
† cited by third party

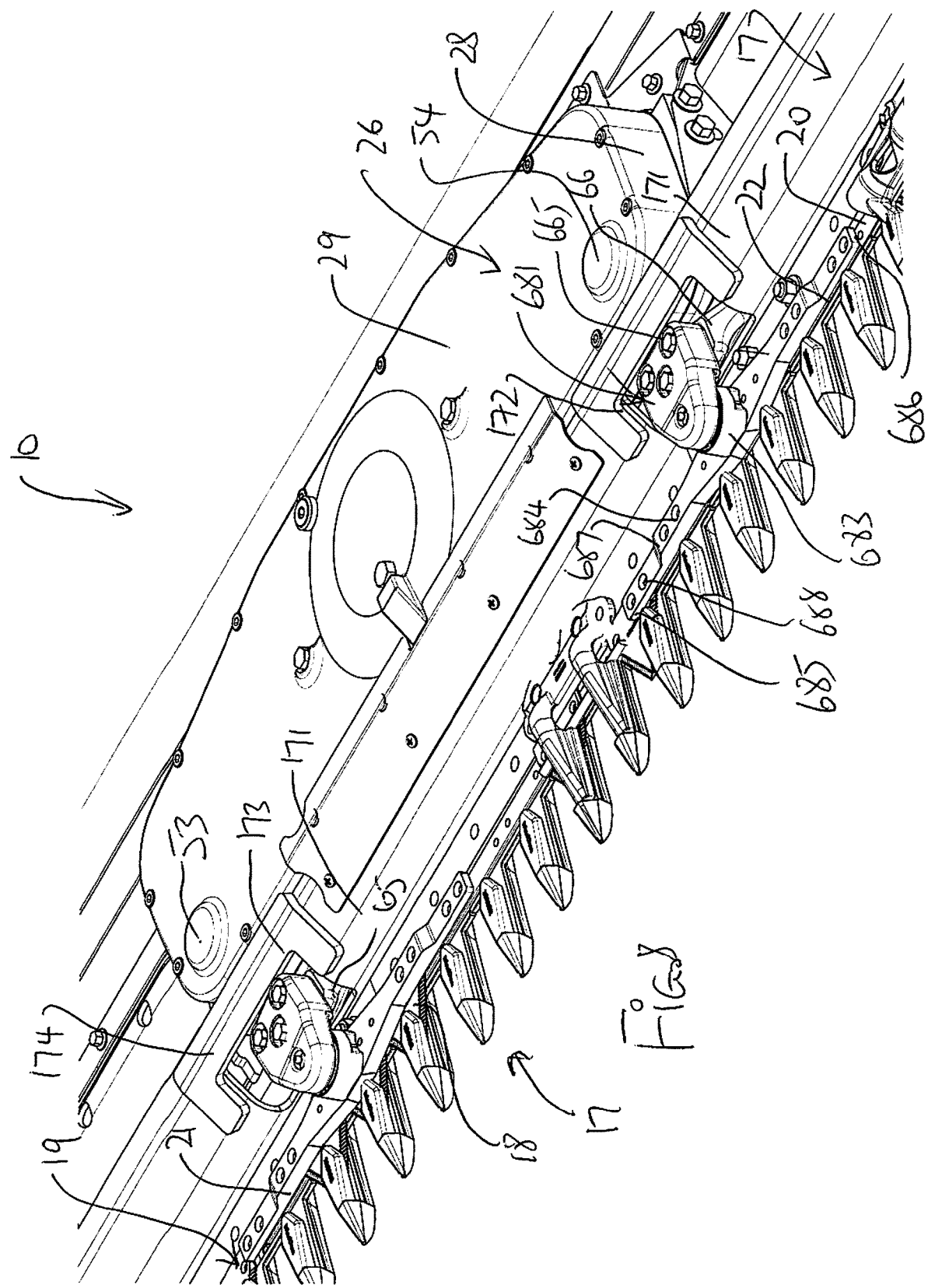

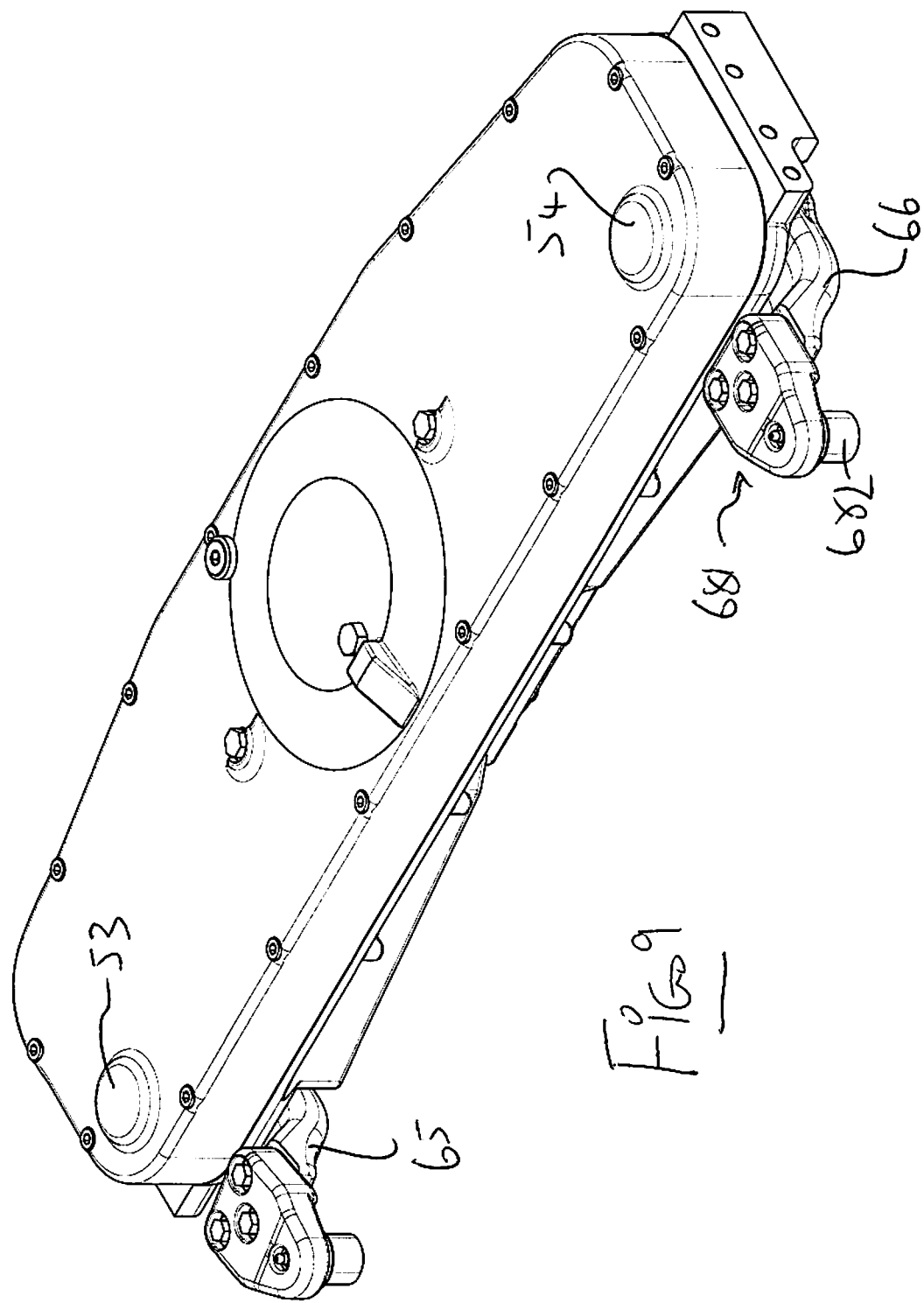

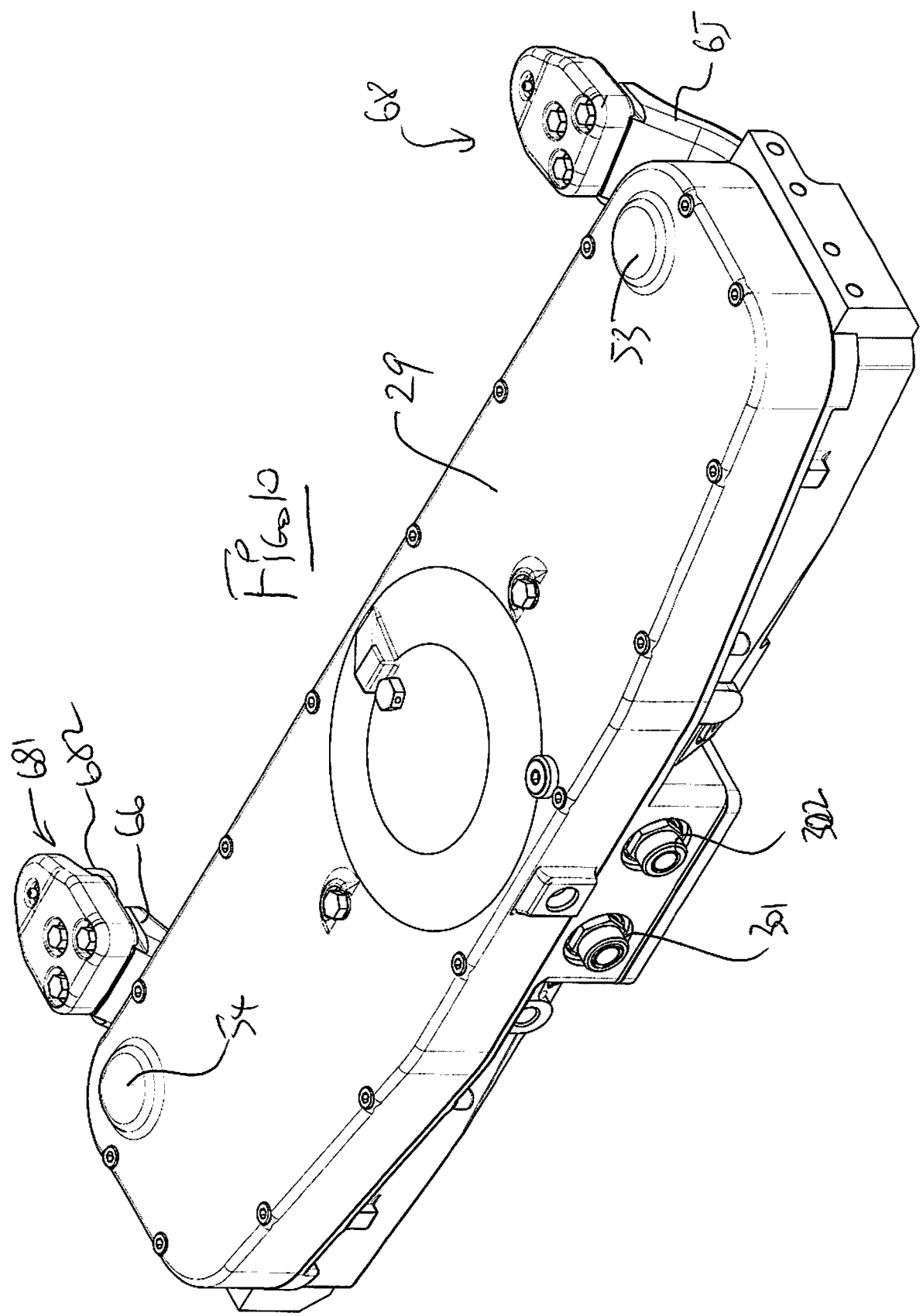

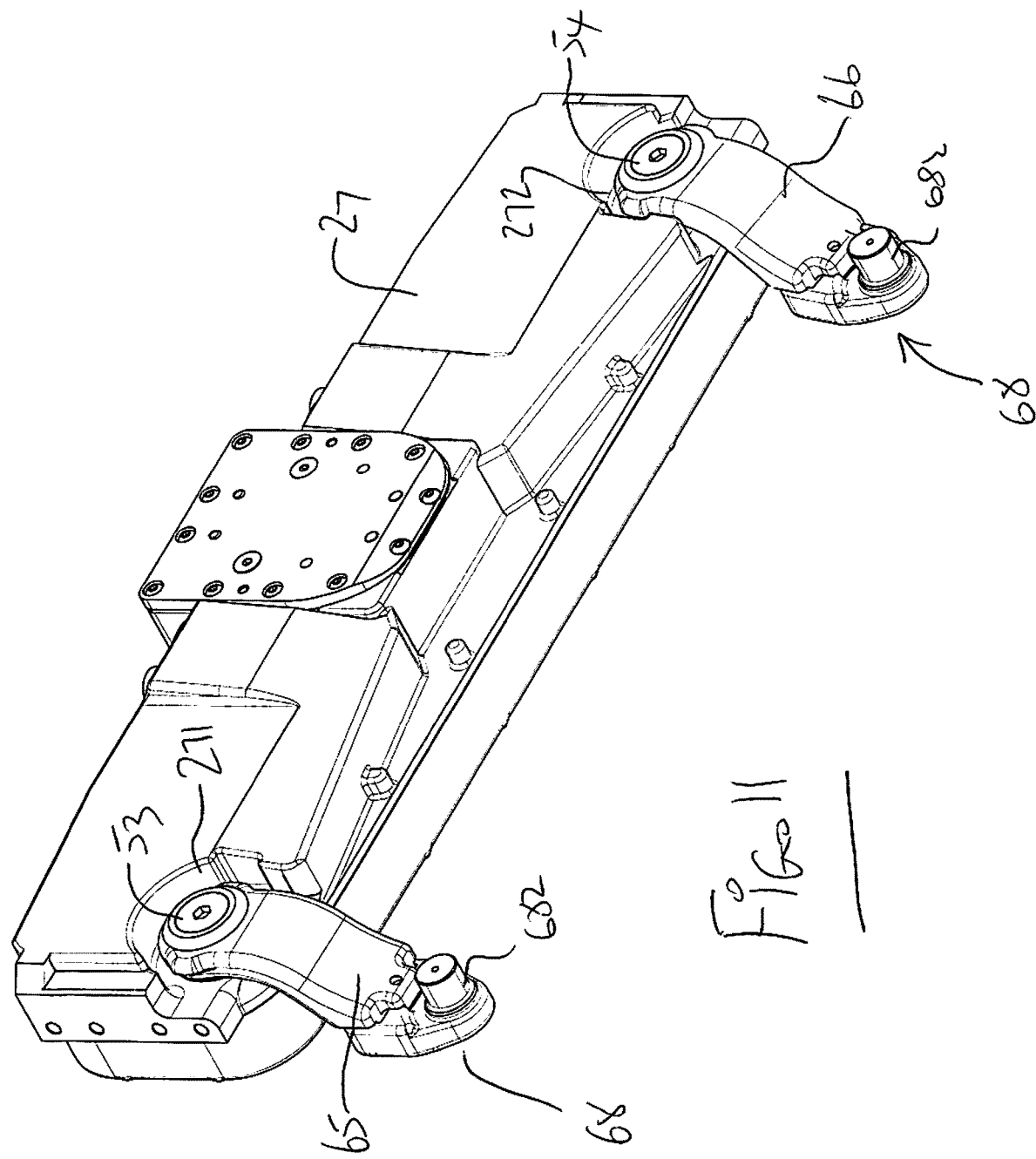

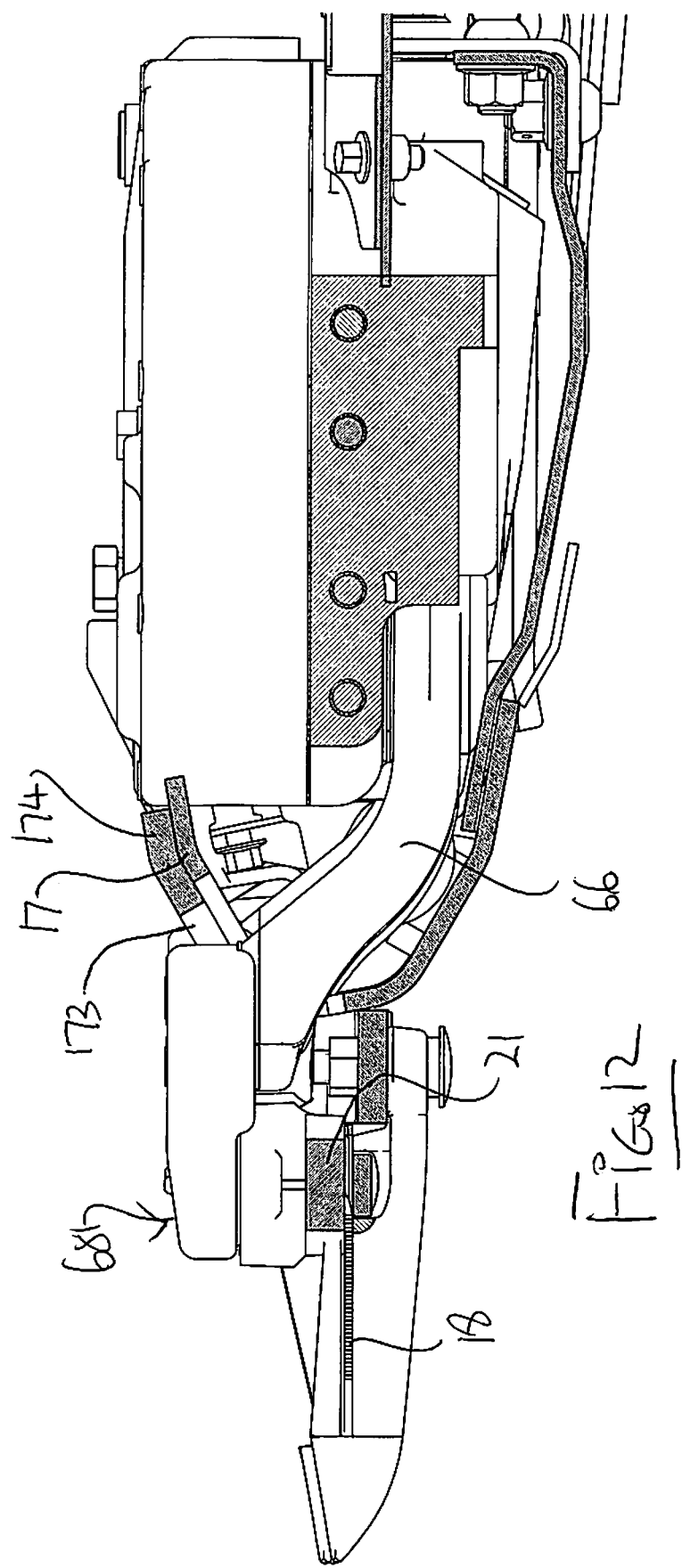

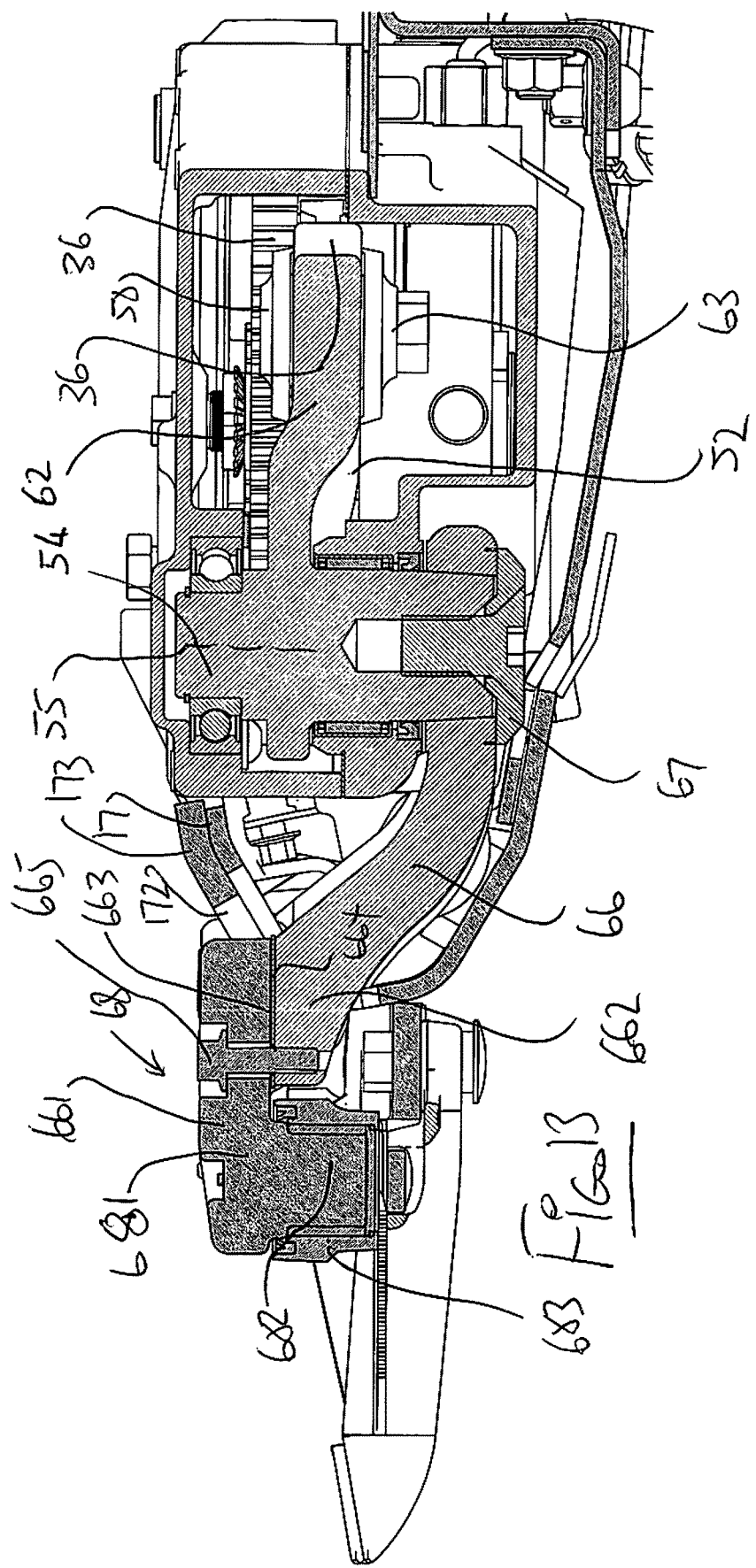

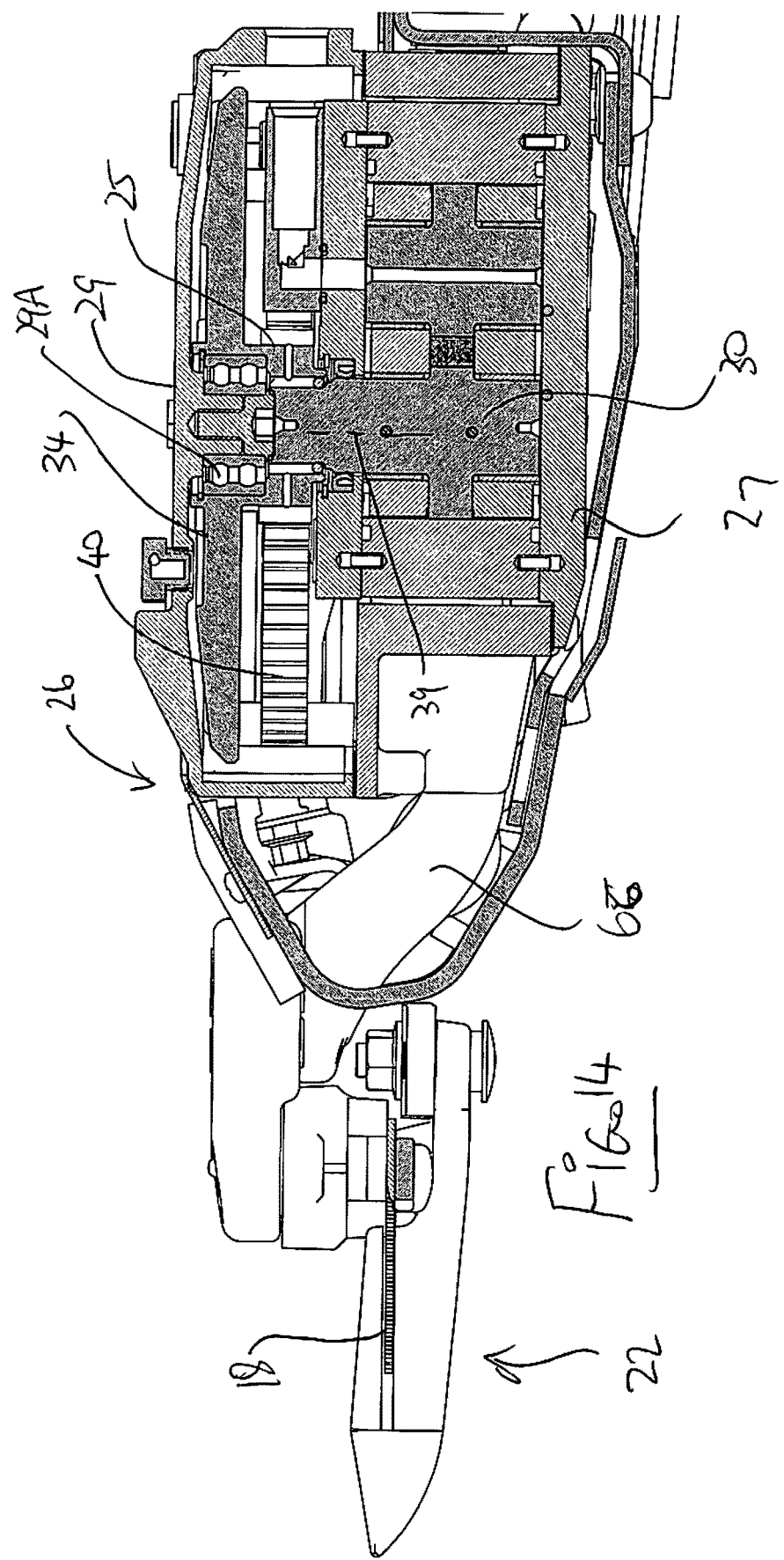

CENTER DRIVE FOR SICKLE KNIFE

This application is a Continuation in Part Application of PCT Application PCT/CA2018/050780 filed 26 Jun. 2018.

This application claims the benefit under 35 USC 119(e) of Provisional application 62/530,435 filed 10 Jul. 2017, the disclosure of which is incorporated herein by reference.

This invention relates generally to a center drive system for the sickle of a header of an agricultural cutting machine, such as a combine, windrower or other crop harvesting machine, or a mower.

BACKGROUND OF THE INVENTION

Sickle knives include a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards.

In a harvesting machine the knife assembly extends along a forward edge portion of the header which can include conveying apparatus, such as one or more augers or drapers for conveying the cut plant material and crops to a feeder inlet of a combine or windrow forming apparatus of a windrower.

The knife assembly is driven in reciprocation longitudinally by an oscillating drive. Such drives are in some cases located at the sides of the header, so as to drive the knife assembly from the end. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

The knife assembly typically must accelerate and decelerate two times per cycle as a result of the reciprocating movement. A typical speed for the knife assembly is up to about 16 cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 or 40 feet wide and greater, two knife assemblies each equal to one-half the extent of the header are often used.

Driving a knife assembly or assemblies of a header from a central location at the center of the header as is well known can provide several advantages compared to a side location. Notably among these advantages, the header structure is not required to support heavy drive units on both sides, such that the structure of the header can be lighter. Long timing apparatus extending between the ends can also be eliminated. If the drive mechanism is incorporated into a location that does not interrupt or require dividing crop or plant material flow through the crop flow area of the header, the normal crop flow of the header is not significantly impacted. And, since the drives are not located in the ends, the end dividers can be made significantly narrower, such that the header can have a shorter overall width, can be more easily maneuverable in relation to adjacent standing crop, and danger of downing the adjacent standing crop is reduced.

However it is necessary that such a structure is structurally sound in order to accommodate the high loads necessary and also that the structure does not interfere with the smooth flow of the crop over the drive and into the conveying system, whether this is an auger on a table or a draper system.

SUMMARY OF THE INVENTION

According to one aspect of the invention there is provided a harvesting machine comprising:

a cutter bar along a forward end of the harvesting machine supported on a frame;

a first sickle knife assembly supported for side to side reciprocating movement and extending from a first end of the cutter bar to a position approximately midway along the cutter bar;

the first sickle knife assembly including a reciprocating first knife bar and a plurality of knife blades side by side along the bar;

a second sickle knife assembly supported for side to side reciprocating movement along a forward end of the harvesting machine and extending from a second end of the cutter bar to said position approximately midway along the cutter bar;

the second sickle knife assembly including a reciprocating second knife bar and a plurality of knife blades side by side along the bar;

a rotary input drive member;

a first rotary member supported for rotation driven by the rotary input drive member about a generally upstanding first rotational axis;

a second rotary member supported for rotation driven by the rotary input drive member about a generally upstanding second rotational axis, which is parallel to and spaced from the first axis;

a first eccentric element connected to the first rotary member for rotation eccentrically about the first rotational axis;

a second eccentric element connected to the second rotary member for rotation eccentrically about the second rotational axis;

a first pivot shaft defining a fixed upstanding first pivot axis at a position spaced from the first rotation axis;

a second pivot shaft defining a fixed upstanding second pivot axis at a position spaced from the second rotation axis;

a first lever mounted for pivotal movement about the first pivot axis driven by a first drive link connected from the first lever to the first eccentric element;

a second lever mounted for pivotal movement about the second pivot axis driven by a second drive link connected from the second lever to the second eccentric element;

a first knife drive arm having a drive end connected in driving relation to the first sickle knife bar and driven in pivotal movement about the first pivot axis by the first lever so as to cause reciprocating movement of the first sickle knife bar along the cutter bar;

a second knife drive arm having a drive end connected in driving relation to the second sickle knife bar and driven in pivotal movement about the second pivot axis by the second lever so as to cause reciprocating movement of the second sickle knife bar along the cutter bar;

and a flywheel driven by the rotary input drive member for common rotation therewith.

According to a second aspect of the invention there is provided a harvesting machine comprising:

a cutter bar along a forward end of the harvesting machine supported on a frame;

a first sickle knife assembly supported for side to side reciprocating movement and extending from a first end of the cutter bar to a position approximately midway along the cutter bar;

the first sickle knife assembly including a reciprocating first knife bar and a plurality of knife blades side by side along the bar;

a second sickle knife assembly supported for side to side reciprocating movement along a forward end of the harvesting machine and extending from a second end of the cutter bar to said position approximately midway along the cutter bar;

the second sickle knife assembly including a reciprocating second knife bar and a plurality of knife blades side by side along the bar;

a rotary input drive member;

a first rotary member supported for rotation driven by the rotary input drive member about a generally upstanding first rotational axis;

a second rotary member supported for rotation driven by the rotary input drive member about a generally upstanding second rotational axis, which is parallel to and spaced from the first axis;

a first eccentric element connected to the first rotary member for rotation eccentrically about the first rotational axis;

a second eccentric element connected to the second rotary member for rotation eccentrically about the second rotational axis;

a first pivot shaft defining a fixed upstanding first pivot axis at a position spaced from the first rotation axis;

a second pivot shaft defining a fixed upstanding second pivot axis at a position spaced from the second rotation axis;

a first lever mounted for pivotal movement about the first pivot axis driven by a first drive link connected from the first lever to the first eccentric element;

a second lever mounted for pivotal movement about the second pivot axis driven by a second drive link connected from the second lever to the second eccentric element;

a first knife drive arm having a drive end connected in driving relation to the first sickle knife bar and driven in pivotal movement about the first pivot axis by the first lever so as to cause reciprocating movement of the first sickle knife bar along the cutter bar;

a second knife drive arm having a drive end connected in driving relation to the second sickle knife bar and driven in pivotal movement about the second pivot axis by the second lever so as to cause reciprocating movement of the second sickle knife bar along the cutter bar;

wherein the disks are driven by a common drive member to rotate in the same direction about the first and second rotary axes.

According to a third aspect of the invention there is provided a harvesting machine comprising:

a cutter bar along a forward end of the harvesting machine;

a first sickle knife assembly supported for side to side reciprocating movement and extending from a first end of the cutter bar to a position approximately midway along the cutter bar;

the first sickle knife assembly including a reciprocating first knife bar and a plurality of knife blades side by side along the bar;

a second sickle knife assembly supported for side to side reciprocating movement along a forward end of the harvesting machine and extending from a second end of the cutter bar to said position approximately midway along the cutter bar;

the second sickle knife assembly including a reciprocating second knife bar and a plurality of knife blades side by side along the bar;

and a drive assembly for driving both the first and second sickle knife assemblies located at said midway position, the drive assembly comprising:

a housing mounted at the midway position behind the cutter bar;

a rotary input drive member mounted in the housing driven by a motor;

a first pivot shaft carried on the housing adjacent the first knife bar and defining a fixed upstanding first pivot axis;

a second pivot shaft carried on the housing adjacent the second knife bar defining a fixed upstanding second pivot axis;

a drive connection in the housing communicating drive from the rotary drive input member to each of the first and second pivot shafts such that each is driven in reciprocating movement back and forth around its respective axis;

a first knife drive arm having a drive end connected in driving relation to the first knife bar and driven in pivotal movement about the first pivot axis by the reciprocating movement of the pivot shaft so as to cause reciprocating movement of the first knife bar along the cutter bar;

a second knife drive arm having a drive end connected in driving relation to the second knife bar and driven in pivotal movement about the second pivot axis by the reciprocating movement of the pivot shaft so as to cause reciprocating movement of the second knife bar along the cutter bar;

the first drive arm being connected at or adjacent a lower end of the second pivot shaft and extending therefrom to a forward end at a position adjacent the first knife bar;

the second drive arm being connected at or adjacent a lower end of the first pivot shaft and extending therefrom to a forward end at a position adjacent the first knife bar;

a first coupling connecting the forward end of the first drive arm to the first knife bar;

and a second coupling connecting the forward end of the second drive arm to the second knife bar.

Preferably the flywheel provides additional instantaneous energy over and above what the motor can supply to drive the knife through a cut in the event that the force required to complete the cut is greater than what the motor torque and the gearbox geometry can generate.

Preferably the flywheel limits the variation from sinusoidal speed profile of the knife movement by providing a force to accelerate and decelerate the knife at each end of the stroke.

Preferably the flywheel limits changes in rotational speed of the first and second rotary members by instantaneously delivering the energy required to accelerate the knife and by storing energy as the knife decelerates.

Preferably the flywheel provides more rotational energy than both of the first and second rotary members combined.

Preferably the flywheel turns faster than the first and second rotary members.

Preferably the flywheel provides more than 500 Joules of energy, preferably more than 1000 J.

Preferably the flywheel provides more than double the energy available in each of the first and second rotary members.

Preferably the flywheel rotates at more than double the speed of the first and second rotary members and preferably more than 3 times.

Preferably the flywheel is part of the rotary input drive member as an integral component therewith.

Preferably both the first and second rotary members are driven by a common drive sprocket located between the first and second rotary members. This acts to drive the members in the same direction. However other drive arrangements can be provided which drive the members in the same direction.

Preferably the flywheel rotates about an axis parallel to and spaced from the first and second rotational axes.

Preferably the flywheel is separate from the first and second rotary members.

Preferably the first and second rotary members comprise disks lying in a common plane.

Preferably the disks are driven by external drive teeth by a common drive member to rotate in the same direction about the first and second rotary axes.

Where the disks are driven in the same direction, the fore and aft movement of the eccentric is out of phase so that fore and aft vibration reduced.

Preferably the disks have external gear teeth and are driven by a common sprocket where the sprocket is preferably directly driven by a hydraulic motor mounted thereon.

Preferably the first and second drive links lie in a common plane with the rotary members and extend radially outwards in opposite directions away from the other rotary member.

Preferably a junction between each of the levers and its respective drive link is located outside a periphery of the respective rotary drive member.

Preferably the rotary input drive member and the first and second rotary members are located in a housing supported on top of a floor pan immediately rearward of the cutter bar.

The energy stored is a square of the rotational speed, so by increasing the speed of the flywheel we get a great benefit in terms of the stored energy. One could also increase the mass of the gears on which the eccentric is mounted in order to store more energy, but the obvious drawback to this is increased mass and size. An alternate arrangement to incorporate a high speed flywheel would be to mount it elsewhere in the box, mated to one of the eccentric gears. The high speed flywheel could also be mounted in an alternate orientation, such as horizontally or at an angle. Both of these alternate arrangements would require more complex gearing, but could be done.

As an example, the current arrangement at an output speed of 1600 strokes per minute has 1336 J of energy available in the flywheel and only 187 J of energy available in each of the eccentric gears. This is related to the flywheel turning at 2500 rpm while the gears turn at 800 rpm.

The flywheel is sized to have a similar amount of stored energy as a conventional double knife drive with two independent flywheels attached to each of the two wobble boxes. This amount of energy has been increased over the years as the length of the cutter bar has grown.

The arrangement of the present invention therefore may have the following features:

Employs an eccentric drive mechanism;
Includes a high speed flywheel to provide inertia;
Knife arm drive gears rotate the same direction;
This design includes a high speed flywheel driven by the motor;
The Gear ratio can be 98/31 or 3.16.

Because of the geometry, the knife stroke per degree of gear rotation is not a constant which means that the knife position will be different with the gear at 90° and at 270°. The result is an acceleration force imbalance of 101 lbs. As one eccentric is in the forward position and one is in the rearward position when the knives are near center stroke, the fore-aft force cancels out. However there is a moment imparted of approximately 90 ft-lbs.

In accordance with a preferred embodiment, the rotary input drive member and the first and second rotary members are located in a housing supported on top of a floor pan immediately rearward of the cutter bar.

In accordance with a preferred embodiment, the first drive arm is connected at or adjacent a lower end of the first pivot shaft and extends therefrom to a forward end at a position adjacent the first sickle knife bar; the second drive arm is connected at or adjacent a lower end of the first pivot shaft and extends therefrom to a forward end at a position adjacent the second sickle knife bar; there is provided a first coupling connecting the forward end of the first drive arm to the first sickle knife bar and there is provided a second coupling connecting the forward end of the second drive arm to the second sickle knife bar.

Preferably the first and second couplings each include a downwardly extending cylindrical pin attached to the drive arm and a cup shaped receptacle for the pin mounted on the respective knife bar.

Preferably the receptacle is attached to the respective knife bar by an elongate connector bar which extends along the respective knife bar in both directions from the receptacle and wherein the connector bar tapers in height and the connector bar is fastened to the knife bar by plurality of screws at spaced positions therealong.

Preferably each of the drive arms includes a cap portion of the drive arm carrying the pin and extending forwardly from a main body of the drive arm, the cap portion being mounted on the main body in a manner which allows height adjustment of the pin relative to the drive arm.

Preferably the pin is fixed to the cap portion for removal therewith from the respective drive arm.

Preferably the main body of each drive arm includes a top surface generally parallel to the knife bar and wherein the respective cap portion has a mating bottom surface screw fastened to the top surface.

Preferably a height adjustment of the pin is provided by shims between the mating surfaces.

Preferably each of the shafts has an upper end contained within the housing.

Preferably the motor is located in the housing below the first and second rotary members.

Preferably the lower end of each of the first and second pivot shafts projects through a bottom wall of the housing and the drive arms extend underneath the housing to a forward end of the housing.

Preferably each of the shafts has an upper end contained within the housing.

Preferably the housing has a top wall at a height substantially aligned with a top of the cutter bar.

Preferably the cutter bar comprises a structural wall forming part of a member onto which are attached knife guards within which the blades of each of the first and second knife bars are guided and wherein each of the drive arms extends through a respective opening in the structural wall of the cutter bar.

Preferably there is provided a stiffening plate mounted onto the structural wall at each of the openings.

BRIEF DESCRIPTION OF THE DRAWINGS

One embodiment of the invention will now be described in conjunction with the accompanying drawings in which:

FIG. 8 is an isometric view of a center section of the cutter bar only of a header showing only relevant parts of the cutter bar and including a center knife drive according to the present invention.

FIG. 9 is a top isometric view of the center knife drive of FIG. 8 taken from the front.

FIG. 10 is a bottom isometric view of the center knife drive of FIG. 8 taken from the rear.

FIG. 11 is a bottom isometric view of the center knife drive of FIG. 8 taken from the front.

FIG. 12 is a cross-sectional view along the lines 4-4 of FIG. 2.

FIG. 13 is a cross-sectional view along the lines 5-5 of FIG. 3.

FIG. 14 is a cross-sectional view along the lines 6-6 of FIG. 3.

DETAILED DESCRIPTION

Figure 1:
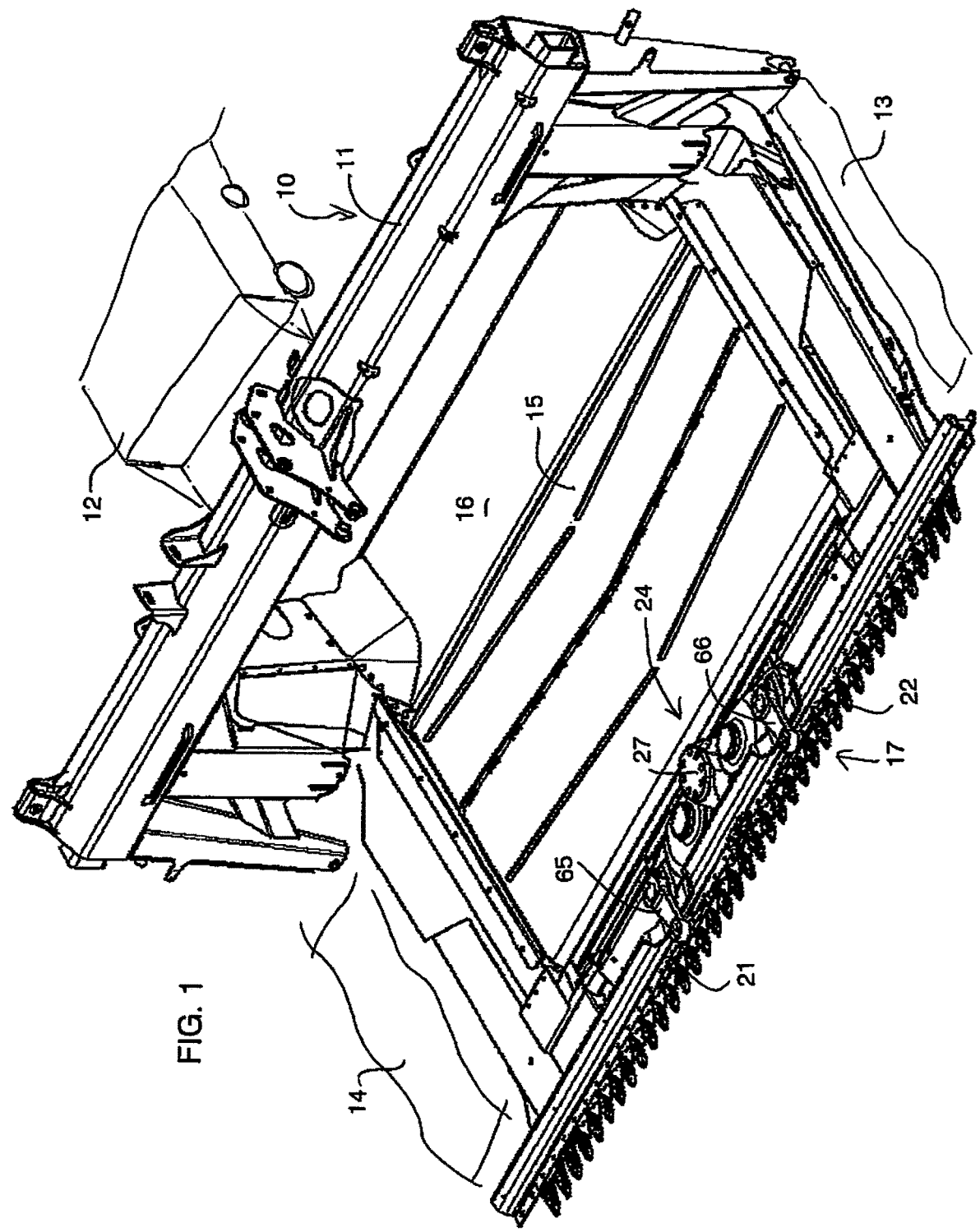
FIG. 1 is an isometric view of a center section of a header according to the present invention showing only relevant parts of the header and including a center knife drive.
Figure 2:
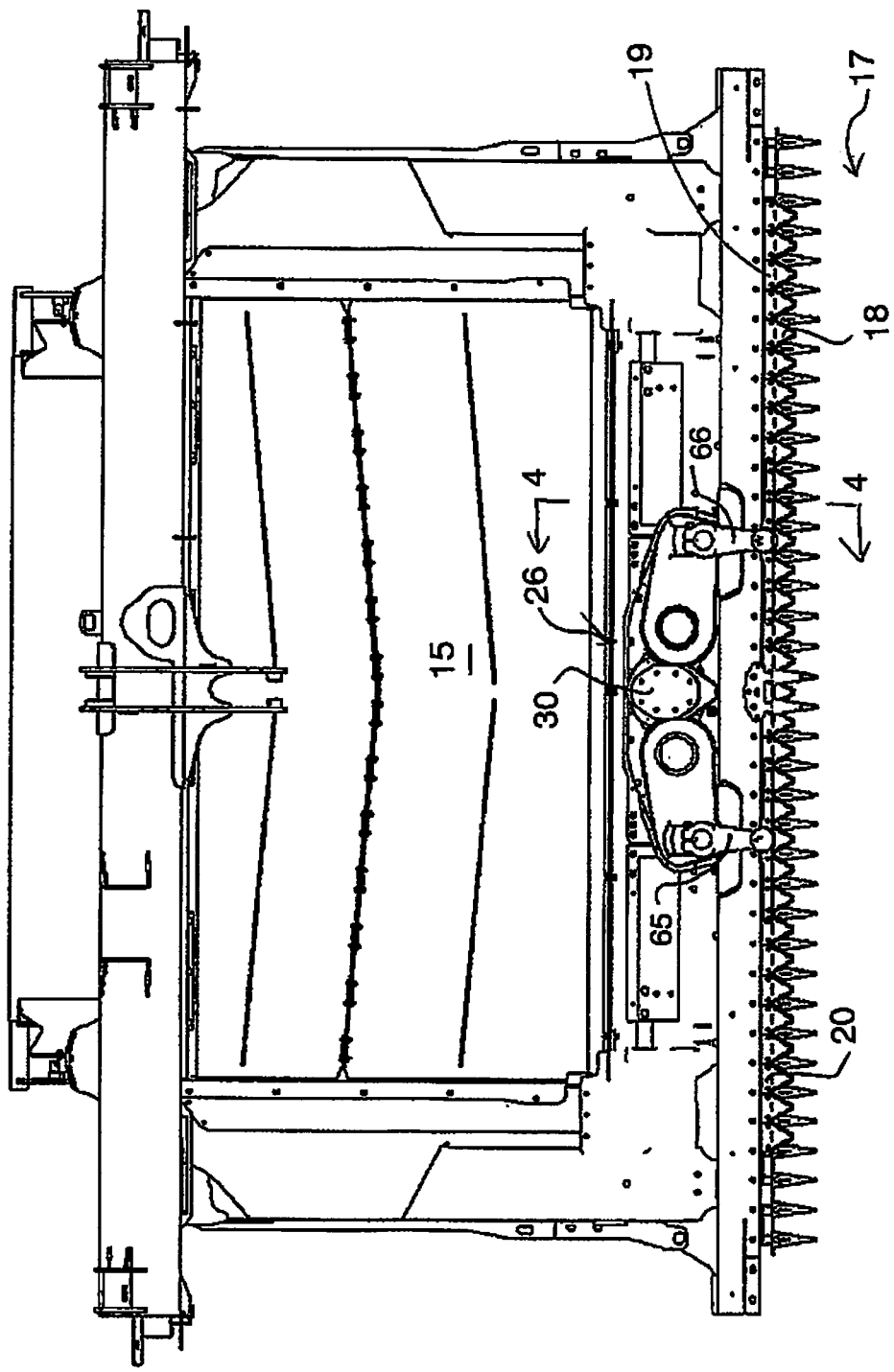
FIG. 2 is a top plan view of the components of FIG. 1.

The header described herein and shown in the Figures is a draper header 10 for use on a harvesting machine 12 where the crop is transported by a pair of side drapers 13 and 14 carried on a frame 11. A feed draper 15 carries the crop rearwardly to a discharge opening 16 feeding to the harvester.

However, the invention can also relate to other types of headers. For example, these can include headers such as a swather header where there is no central feed draper and the crop is discharged directly to the ground or an auger header where the crop is transported by a pair of augers at the rear of a header floor.

The header can be rigid so that the cutter bar does not flex or it can be a header of the flexing type where the cutter bar flexes independently of a rigid frame or as part of a flexing frame. The header is shown only in part as these variations are well known to a person skilled in the art.

Thus the parts of the harvesting header with which the present invention is concerned comprise a cutter bar 17 along a forward end of the harvesting machine supported on the frame 11, a first sickle knife assembly 19 supported for side to side reciprocating movement and extending from a first end of the cutter bar to a position approximately midway along the cutter bar and a second sickle knife assembly 20 supported for side to side reciprocating movement along a forward end of the harvesting machine and extending from a second end of the cutter bar to the position approximately midway along the cutter bar.

Each of the first and second sickle knife assemblies 19 and 20 includes a reciprocating knife bar 21, 22 and a plurality of knife blades 18 side by side along the bars. All of the above is well known to persons skilled in the art.

Figure 3:
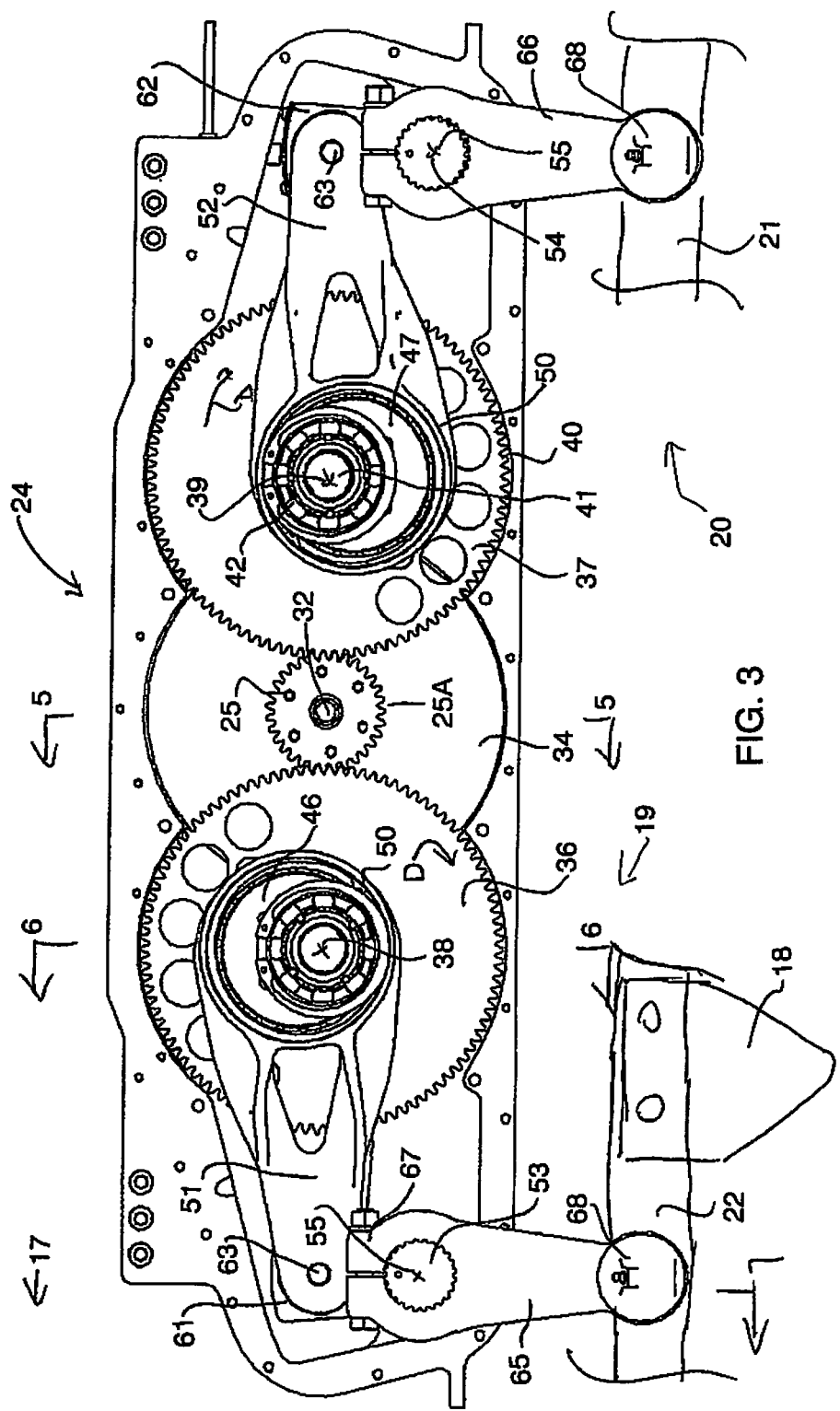
FIG. 3 is a top plan view of the center knife drive of FIG. 1 taken in isolation from the remainder of the header.
Figure 5:
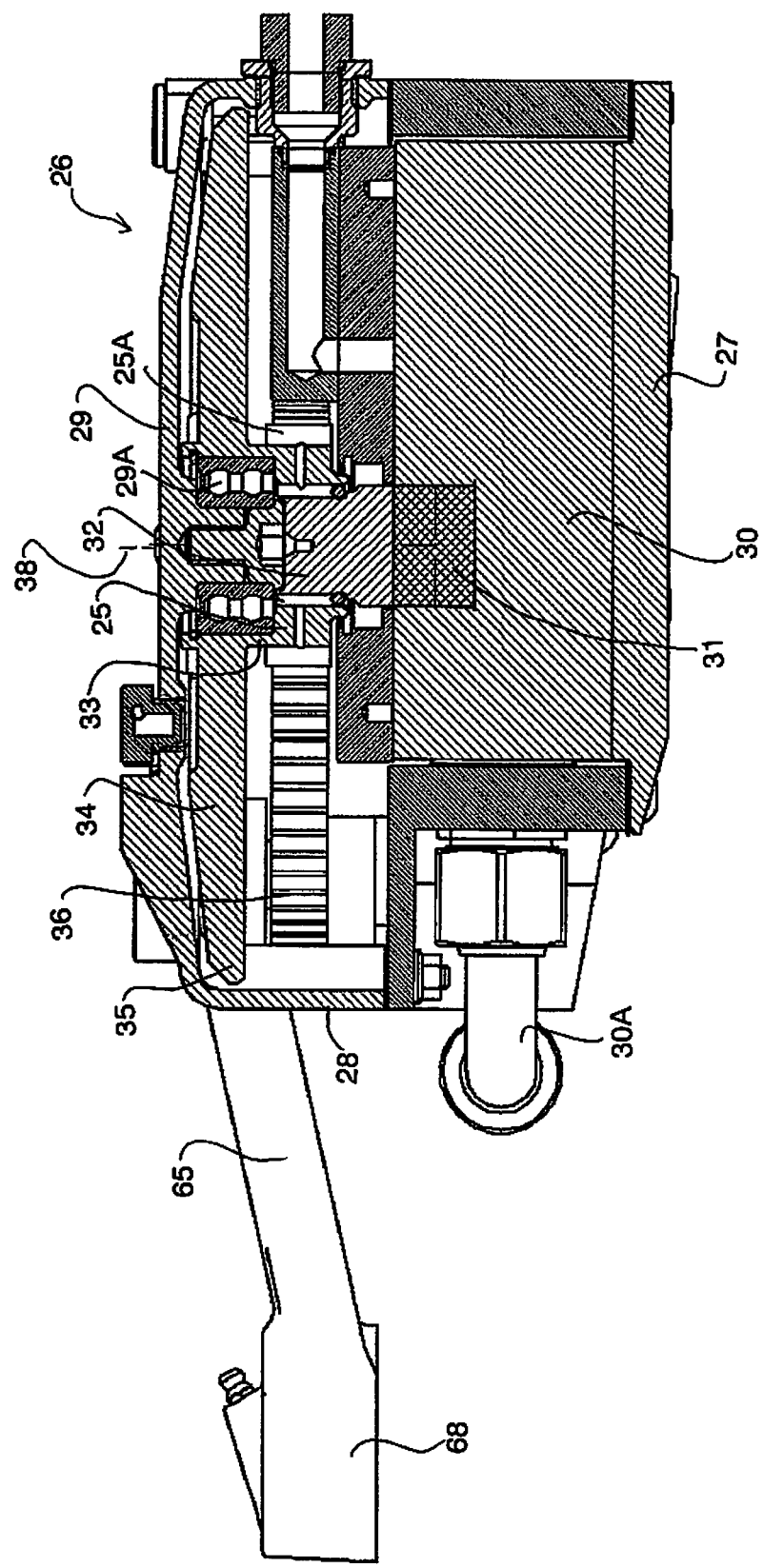
FIG. 5 is a cross-sectional view along the lines 5-5 of FIG. 3.

The operation of the novel center drive system 24 of the present application is best shown in FIG. 3 where the parts of the housing and other components are omitted to better show the operation of the system. The structure is best shown in the cross-section of FIG. 5.

This comprises a rotary input drive member or sprocket 25 mounted in a housing 26 with a lower pan 27 with upstanding side walls 28 mating with an upper cover 29. The sprocket 25 is driven by a hydraulic motor 30 attached to a bottom pan or bottom cover plate 27A of the motor housing and driving a shaft 31 connected to the sprocket 25 at a section 32. The sprocket 25 has external drive teeth 25A. At the top of the shaft 32 on a collar 33 of the sprocket 25 is carried a fly wheel 34 which thus rotates with the sprocket 25. The flywheel 34 is shaped to fit in the housing under the top cover 29 and with an outer edge 35 within the walls 28. The input gear or sprocket 25 is mounted to the motor shaft 31 which is attached to the bottom housing 27A. The input gear/flywheel 34 is not attached to the top cover 29 so that the flywheel 34 rotates relative to the top cover on bearings 29A.

In this embodiment as shown, the motor is at the bottom of the structure just above the pan 17. This locates the hydraulic supply lines 30A to the motor 30 at the bottom of the structure for better location relative to the cutter bar. This arrangement also provides a better geometry which allows better crop flow over the top cover 29. However the components can be arranged in an inverted manner with the motor at the top.

The drive further includes a first and second rotary member 36, 37 supported for rotation about respective axes 38, 39. Each member has external gear teeth 40 in a common plane with the teeth of the sprocket so as to be driven by the rotary sprocket about its respective axis which is generally upstanding or at right angles to the plane of movement of the knife bars.

Figure 6:
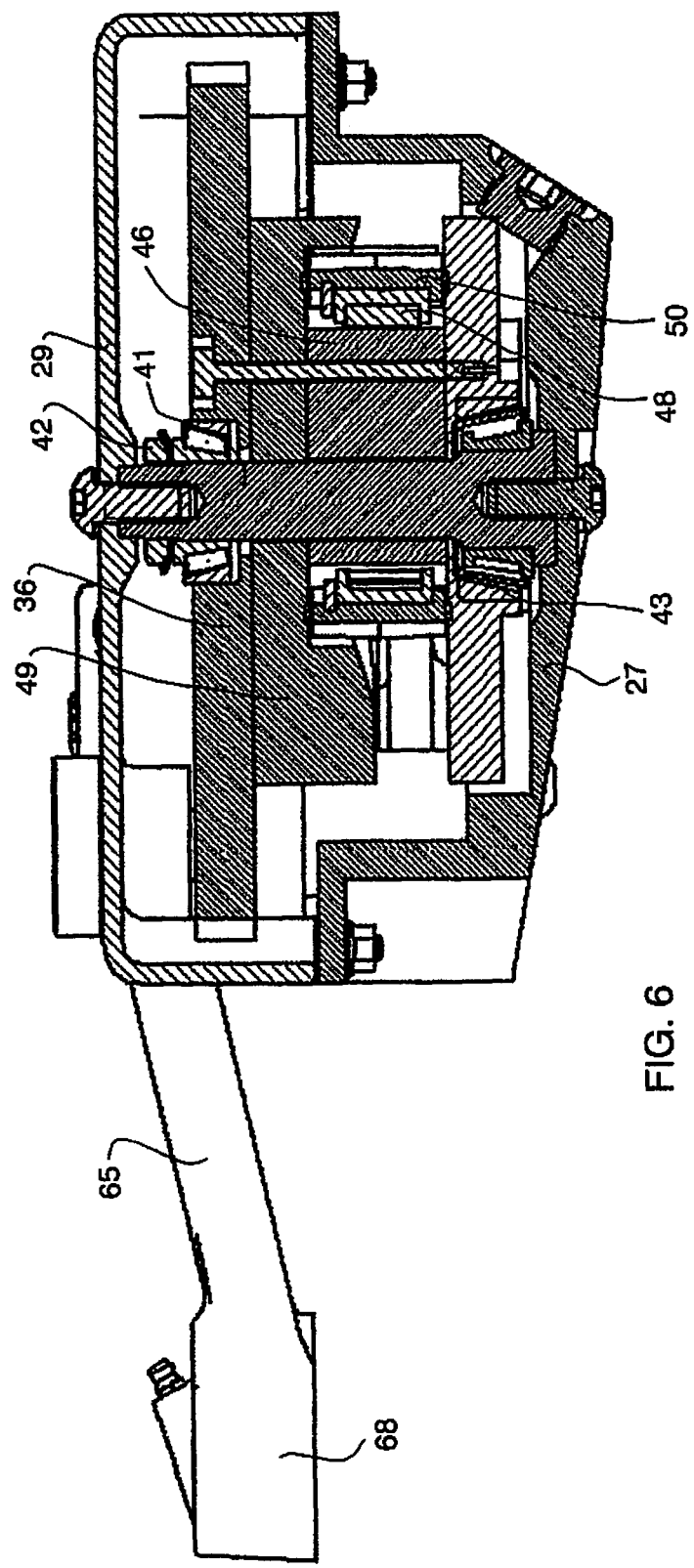
FIG. 6 is a cross-sectional view along the lines 6-6 of FIG. 3.

As best shown in FIG. 6 where one of the rotary members 36 is shown, the rotary member is mounted on a shaft 41 attached to the upper cover 29 and lower pan 27 and carrying upper and lower bearings 42, 43 mounted in the housing at the upper cover 29 and lower pan respectively. The arrangement of the rotary member 37 is symmetrical.

Thus, as the sprocket 25 rotates, it drives both of the rotary members 36 and 37 about their respective parallel axes in a common plane generally parallel to the plane of movement of the knife bars. As the sprocket is considerably smaller than the disks forming the members 36, 37, the sprocket rotates at a much faster rate of the order of three times the angular rate of the disks 36, 37.

Each of the rotary members or disks 36, 37 carries a respective eccentric element 46, 47 connected to the rotary member 36, 37 on bearings 48 for rotation eccentrically about the first rotational axis 38. That is an inner eccentric 49 is keyed to the disk for rotation therewith at a position offset from the rotary axis and carries the bearing 48 which in turn supports an inner ring 50 of a respective link 51, 52.

The drive further includes fixed first and second pivot shafts 53 and 54 each defining a fixed upstanding respective pivot axis 55 at a position spaced from the first rotation axis

Figure 7:
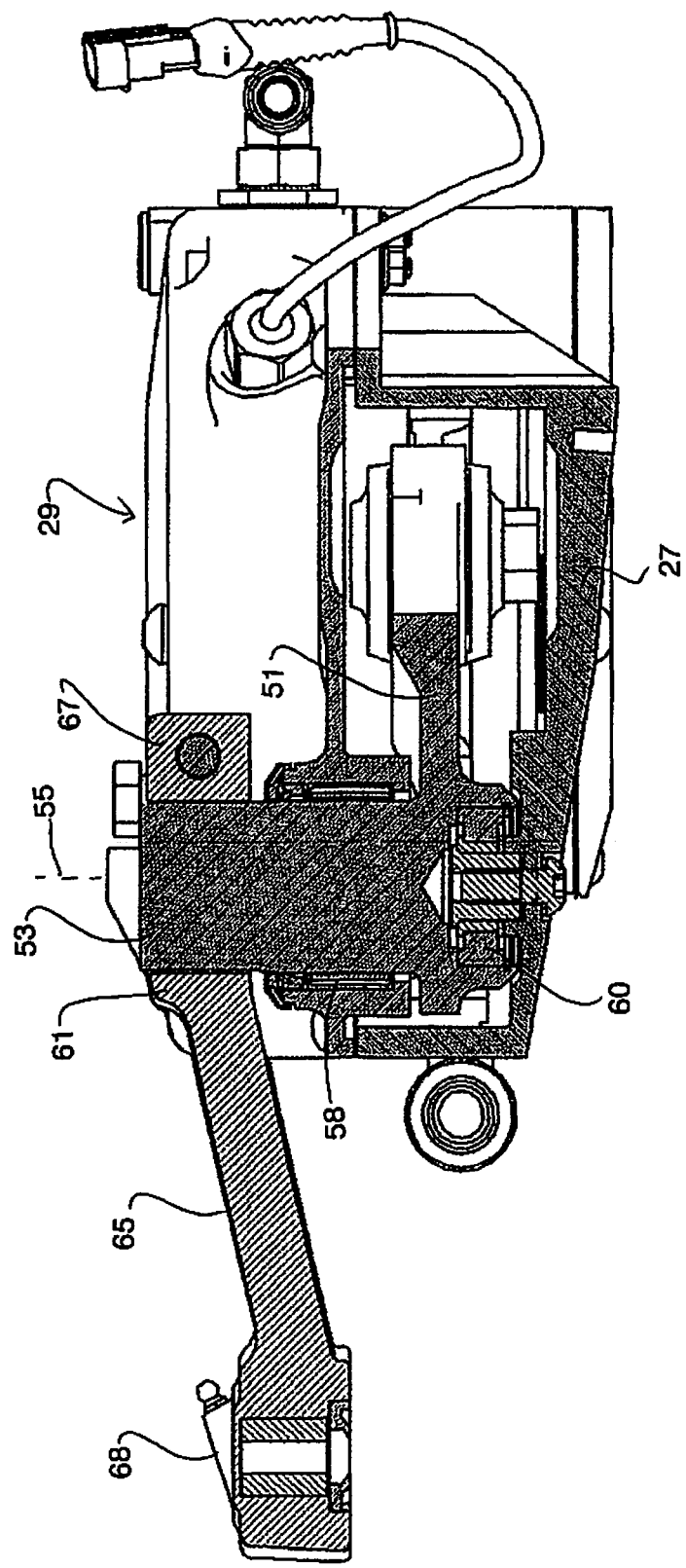
FIG. 7 is a cross-sectional view along the lines 7-7 of FIG. 3.

38, 39. Each shaft is as shown in FIG. 7 at 53 carried in the housing in bearings 58, 60 in the upper and lower part of the housing so that the axis 55 is fixed in the housing but the shaft can oscillate back and forth around the axis 55 in the bearings 58, 60.

First and second levers 61, 62 are attached to the shafts 53, 54 for pivotal movement about the first pivot axis 55 driven by the respective drive links 51, 52 connected from the lever 61, 62 to the respective eccentric element 46, 47. Thus as shown in FIGS. 3 and 7, the link 51 driven by the eccentric 46 is connected to the lever 61 by a pin 63 and acts to oscillate the shaft 53, 54 back and forth about the axis 55. Symmetrically the lever 62 is driven by the link 52 and connected thereto by the pin 63 which forms a junction between the link and the lever 62.

First and second knife drive arms 65 and 66 are clamped onto the respective shafts 53, 54 by clamp 67 surrounding a knurled part of the shaft at the top of the shaft above the lever 61. Each drive arm 65, 66 has a drive end 68 connected in driving relation to the respective sickle knife bar 21, 22. Each drive arm is driven in pivotal oscillating movement about the pivot axis 55 by the lever 61 so as to cause reciprocating movement of the first sickle knife bar 22 along the cutter bar.

The arrangement shown in the figures has the following key features:

The flywheel 34 is driven by the rotary input drive member or sprocket 25 for common rotation therewith.

The disks 36, 37 are driven by the sprocket 25 to rotate in the same direction D about the first and second rotary axes. 38, 39

The flywheel 34 provides additional instantaneous energy over and above that which the motor can supply to drive the knife through a cut in the event that the force required to complete the cut is greater than what the motor torque and the gearbox geometry can generate.

The flywheel 34 limits the variation in knife speed by providing a force to accelerate and decelerate the knife at each end of the stroke.

The flywheel 34 limits changes in rotational speed of the first and second rotary members 36, 37 by instantaneously delivering the energy required to accelerate the knife bars 21, 22.

The flywheel 34 provides more rotational energy than both of the first and second rotary members 36, 37 combined.

The flywheel 34 turns faster than the first and second rotary members in view of the smaller diameter of the sprocket relative to the two disks.

The flywheel 34 provides more than 500 Joules of energy, preferably more than 1000 J when rotating at conventional speeds to drive the knife at a rate of the order of 1600c/min.

The flywheel 34 provides more than double the energy available in each of the first and second rotary members 36, 37.

The flywheel rotates 34 at more than double the speed of the first and second rotary members 36, 37 and preferably more than 3 times.

The first and second rotary members comprise disks 36, 37 lying in a common plane with the drive sprocket 25.

As shown in FIG. 3, because the disks are driven in the same direction D, the fore and aft movement of the eccentrics 46, 47 is out of phase where the eccentric 46 is at the rear part of the disk 36 and the eccentric 47 is at the front part of the disk 37 adjacent the cutter bar 17. In this way the movements are balanced out and so that fore and aft vibration reduced.

As shown in FIG. 3, the first and second drive links 51, 52 lie in a common plane with the rotary members 36, 37 and each extends radially outwards in opposite direction relative to its partner as shown at the 3.00 o'clock and 9 o'clock positions away from the opposite rotary member. This is clearly different from and advantageous relative to an arrangement in which the links cross over the disks through the middle of the system.

As shown in FIG. 3, the pins 63 forming the junction between each of the levers 61, 62 and its respective drive link 51, 52 is located outside a periphery of the respective rotary drive member or disk 36, 37. This is clearly different from and advantageous relative to an arrangement in which the pins 63 overlie the respective disk 36, 37 since this provides increased mechanical advantage.

Figure 4:
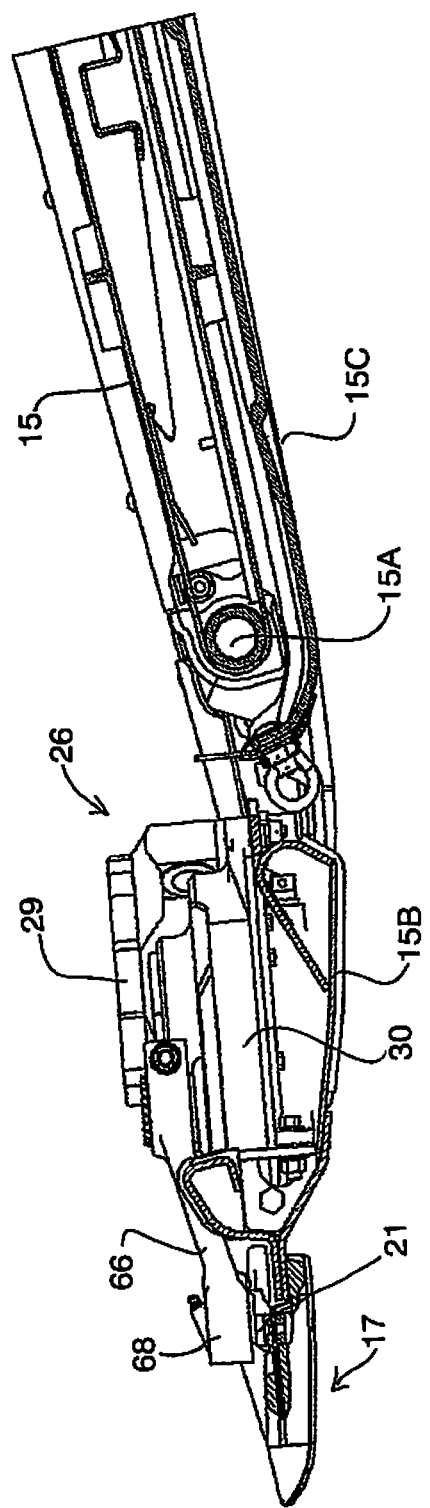
FIG. 4 is a cross-sectional view along the lines 4-4 of FIG. 2.

As shown in FIG. 4, the housing 26 including the rotary input drive member 25 and the first and second rotary members 36, 37 are located on top of a floor pan 15B immediately rearward of the cutter bar 17 and in front of the front roller 15A of the feed draper 15. Behind the floor pan and underneath the feed draper is provided a flexible pan 15C of an adapter system which connects the header to the harvester. This is clearly different from and advantageous relative to an arrangement in which the drive system is located underneath the floor which is of course then exposed to the engagement with the ground. In this arrangement the drive is protected behind the generally C-shaped cutter bar and is held away from any potential contamination caused by engagement with the ground.

The arrangement shown in the second embodiment of FIGS. 8 to 14 operates in the same manner as set out above and as shown best in FIG. 14, using the same reference numbers, provides a harvesting machine substantially as described above where the flywheel 34 provides more rotational energy than both of the first and second rotary members combined, turns faster than the first and second rotary members and provides more than 500 Joules of energy.

The flywheel 34 is a common rotary member with the rotary input drive member of the motor 30.

The rotary input drive member of the motor 30 comprises a sprocket 25 located between the first and second rotary members 36 and 37, wherein the first and second rotary members comprise 36, 37 disks lying in a common plane and the disks are driven by external drive teeth on the sprocket 25 to rotate in the same direction about the first and second rotary axes.

However the arrangement shown in the first embodiment is modified in the second embodiment in the features as described hereinafter.

In this embodiment as shown in FIGS. 9, 11 and 13 the first and second drive arms 65 and 66 are connected at or adjacent a lower end of the pivot shafts 53, 54 and extend therefrom to a forward end 68 at a position adjacent the respective sickle knife bar and there is provided a coupling 681 connecting the forward end of the drive arm to the respective sickle knife bar.

Each coupling 681 includes a downwardly extending cylindrical pin 682 attached to the drive arm 65, 66 and a cup shaped receptacle 683 for the pin mounted on the respective knife bar 21, 22. The receptacle 683 as best shown in FIG. 8 is attached to the respective knife bar 21, 22 by an elongate connector bar 684 which extends along the respective knife bar in both directions from the receptacle 683 to ends 685 and 686 of the bar 684. The connector bar 684 tapers in height at steps 687 from a thickest portion at the receptacle to thinner portions adjacent the ends. The connector bar 684 is fastened to the knife bar 21, 22 by plurality of screws 688 at spaced positions along the bar both in the thicker and thinner portions of the bar.

As best shown in FIG. 13, each of the drive arms 66 includes a cap portion 661 of the drive arm 66 carrying the pin 682 as an integral component thereof. The cap portion 661 extends forwardly from a main body 662 of the drive arm 66. The cap portion 661 mounted on the main body 662 at mating surfaces 663 and 664 transverse to the axis of the pin 682. These mating surfaces allow height adjustment of the pin 682 relative to the drive arm 66 by insertion of selected shims therebetween prior to fastening together of the mating surfaces by screws 665. The connection between the pin and the cap portion allows for removal of the pin from the respective drive arm for installation and adjustment.

That is the main body 662 of each drive arm 66 includes a top surface 664 generally parallel to the knife bar 21, 22 with the respective cap portion having a mating bottom surface 663 screw fastened to the top surface.

The pin 682, therefore extends downwardly from the top of the arm in front of the housing with the arms extending underneath the housing to connect to the shaft 53, 54 at the bottom. This provides an improved ergonomic arrangement with better transmission of forces from the shafts 53, 54 to the respective sickle bar. This also allows the required simple installation for repairs and replacement and simple adjustment to ensure proper movement both in initial installation and if necessary, after wear.

With regard to the change in structure where the arms 55 and 56 are attached at the bottom of the shafts rather than the top as shown in the first embodiment allows each of the shafts 53 and 54 to have its upper end as shown in FIG. 8 contained within the housing rather than projecting through the housing to reduce potential hang up of crops.

In this embodiment the motor is located in the housing below the first and second rotary members which provides a better location for the hydraulic fluid ports 301 and 302 at the rear of the housing.

In this embodiment, the lower end of each of the first and second pivot shafts 53, 54 projects through the bottom wall 27 of the housing into recesses 2271 and 272 at the ends of the housing and the drive arms extend from the recesses underneath the housing to a forward end of the housing where they curve upwardly and forwardly to the connection 681.

This arrangement also allows a generally flat top wall of the housing to be located at a height substantially aligned with or just above a top of the conventional channel or C-shaped cutter bar 17 and the top of the connectors 681. The cutter bar 17 as in conventional arrangements comprises a structural wall 171 forming part of a member onto which are attached knife guards. Each of the drive arms 65, 66 extends through a respective opening 172, 173 in the structural wall 171 of the cutter bar. There is provided a stiffening plate 174 mounted onto the structural wall at each of the openings 172, 173.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A harvesting machine comprising:
a cutter bar along a forward end of the harvesting machine supported on a frame;
a first sickle knife assembly supported for side to side reciprocating movement and extending from a first end of the cutter bar to a position approximately midway along the cutter bar;
the first sickle knife assembly including a reciprocating first knife bar and a plurality of knife blades side by side along the bar;
a second sickle knife assembly supported for side to side reciprocating movement along a forward end of the harvesting machine and extending from a second end of the cutter bar to said position approximately midway along the cutter bar;
the second sickle knife assembly including a reciprocating second knife bar and a plurality of knife blades side by side along the bar;
a rotary input drive member driven by a motor;
a first rotary member supported for rotation driven by the rotary input drive member about a generally upstanding first rotational axis;
a second rotary member supported for rotation driven by the rotary input drive member about a generally upstanding second rotational axis, which is parallel to and spaced from the first axis;
a first eccentric element connected to the first rotary member for rotation eccentrically about the first rotational axis;
a second eccentric element connected to the second rotary member for rotation eccentrically about the second rotational axis;
a first pivot shaft defining a fixed upstanding first pivot axis at a position spaced from the first rotation axis;
a second pivot shaft defining a fixed upstanding second pivot axis at a position spaced from the second rotation axis;
a first lever mounted for pivotal movement about the first pivot axis driven by a first drive link connected from the first lever to the first eccentric element;
a second lever mounted for pivotal movement about the second pivot axis driven by a second drive link connected from the second lever to the second eccentric element;
a first knife drive arm having a drive end connected in driving relation to the first sickle knife bar and driven in pivotal movement about the first pivot axis by the first lever so as to cause reciprocating movement of the first sickle knife bar along the cutter bar;
a second knife drive arm having a drive end connected in driving relation to the second sickle knife bar and driven in pivotal movement about the second pivot axis by the second lever so as to cause reciprocating movement of the second sickle knife bar along the cutter bar;
the first drive arm is connected at or adjacent a lower end of the first pivot shaft and extends therefrom to a forward end at a position adjacent the first sickle knife bar;
the second drive arm is connected at or adjacent a lower end of the first pivot shaft and extends therefrom to a forward end at a position adjacent the second sickle knife bar; wherein there is provided a first coupling connecting the forward end of the first drive arm to the first sickle knife bar and a second coupling connecting the forward end of the second drive arm to the second sickle knife bar;
and a flywheel driven by the rotary input drive member for common rotation therewith.

2. The harvesting machine according to claim 1 wherein the flywheel provides more rotational energy than both of the first and second rotary members combined, turns faster than the first and second rotary members and provides more than 500 Joules of energy.

3. The harvesting machine according to claim 1 wherein the flywheel is a common rotary member with the rotary input drive member.

4. The harvesting machine according to claim 1 wherein the rotary input drive member comprises a sprocket located between the first and second rotary members, wherein the first and second rotary members comprise disks lying in a common plane and wherein the disks are driven by external drive teeth on the sprocket to rotate in the same direction about the first and second rotary axes wherein, because the disks rotate in the same direction, the fore and aft movement of the eccentric elements is out of phase so that fore and aft vibration is reduced.

5. The harvesting machine according to claim 1 wherein a junction between each of the first and second levers and its respective one of the first and second drive links is located outside a periphery of the respective rotary member.

6. The harvesting machine according to claim 1 wherein the rotary input drive member and the first and second rotary members are located in a housing supported on top of a floor pan immediately rearward of the cutter bar.

7. The harvesting machine according to claim 1 wherein said first and second couplings each include a downwardly extending cylindrical pin attached to the drive arm and a cup shaped receptacle for the pin mounted on the respective knife bar.

8. The harvesting machine according to claim 7 wherein the receptacle is attached to the respective knife bar by an elongate connector bar which extends along the respective knife bar in both directions from the receptacle and wherein the connector bar tapers in height and the connector bar is fastened to the knife bar by plurality of screws at spaced positions therealong.

9. The harvesting machine according to claim 7 wherein each of said drive arms includes a cap portion of the drive arm carrying the pin and extending forwardly from a main body of the drive arm, the cap portion being mounted on the main body in a manner which allows height adjustment of the pin relative to the drive arm.

10. The harvesting machine according to claim 9 wherein the pin is fixed to the cap portion for removal therewith from the respective drive arm.

11. The harvesting machine according to claim 9 wherein the main body of each drive arm includes a top surface generally parallel to the knife bar and wherein the respective cap portion has a mating bottom surface screw fastened to the top surface.

12. The harvesting machine according to claim 11 wherein a height adjustment of the pin is provided by shims between the mating surfaces.

13. The harvesting machine according to claim 6 wherein each of the shafts has an upper end contained within the housing.

14. The harvesting machine according to claim 6 wherein the motor is located in the housing below the first and second rotary members.

15. The harvesting machine according to claim 6 wherein said lower end of each of the first and second pivot shafts projects through a bottom wall of the housing and the drive arms extend underneath the housing to a forward end of the housing.

16. The harvesting machine according to claim 6 wherein each of the shafts has an upper end contained within the housing.

17. The harvesting machine according to claim 6 wherein the housing has a top wall at a height substantially aligned with a top of the cutter bar.

18. The harvesting machine according to claim 1 wherein the cutter bar comprises a structural wall forming part of a member onto which are attached knife guards within which the blades of each of the first and second knife bars are guided and wherein each of the drive arms extends through a respective opening in the structural wall of the cutter bar.

19. The harvesting machine according to claim 18 wherein there is provided a stiffening plate mounted onto the structural wall at each of the openings.

20. A harvesting machine comprising:
a cutter bar along a forward end of the harvesting machine;
a first sickle knife assembly supported for side to side reciprocating movement and extending from a first end of the cutter bar to a position approximately midway along the cutter bar;
the first sickle knife assembly including a reciprocating first knife bar and a plurality of knife blades side by side along the bar;
a second sickle knife assembly supported for side to side reciprocating movement along a forward end of the harvesting machine and extending from a second end of the cutter bar to said position approximately midway along the cutter bar;
the second sickle knife assembly including a reciprocating second knife bar and a plurality of knife blades side by side along the bar;
and a drive assembly for driving both the first and second sickle knife assemblies located at said midway position, the drive assembly comprising:
a housing mounted at the midway position behind the cutter bar;
a rotary input drive member mounted in the housing driven by a motor;
a first pivot shaft carried on the housing adjacent the first knife bar and defining a fixed upstanding first pivot axis;
a second pivot shaft carried on the housing adjacent the second knife bar defining a fixed upstanding second pivot axis;
a drive connection in the housing communicating drive from the rotary drive input member to each of the first and second pivot shafts such that each is driven in reciprocating movement back and forth around its respective axis;
a first knife drive arm having a drive end connected in driving relation to the first knife bar and driven in pivotal movement about the first pivot axis by the reciprocating movement of the pivot shaft so as to cause reciprocating movement of the first knife bar along the cutter bar;
a second knife drive arm having a drive end connected in driving relation to the second knife bar and driven in pivotal movement about the second pivot axis by the reciprocating movement of the pivot shaft so as to cause reciprocating movement of the second knife bar along the cutter bar;
the first drive arm being connected at or adjacent a lower end of the second pivot shaft and extending therefrom to a forward end at a position adjacent the first knife bar;

the second drive arm being connected at or adjacent a lower end of the first pivot shaft and extending therefrom to a forward end at a position adjacent the first knife bar;

a first coupling connecting the forward end of the first drive arm to the first knife bar;

and a second coupling connecting the forward end of the second drive arm to the second knife bar.

21. The harvesting machine according to claim 20 wherein each of the first and second drive arms extends from the respective pivot shaft upwardly and forwardly to a forward end at a position above the respective one of the first and second knife bars.

22. The harvesting machine according to claim 20 wherein said lower end of each of the first and second pivot shafts projects through a bottom wall of the housing and the drive arms extend underneath the housing to a forward end of the housing.

23. The harvesting machine according to claim 20 wherein each of the shafts has an upper end contained within the housing.

24. The harvesting machine according to claim 15 wherein the housing has a top wall at a height substantially aligned with a top of the cutter bar.

25. The harvesting machine according to claim 20 wherein there is a floor pan extending rearwardly from the cutter bar and wherein the housing is mounted above the floor pan.

26. The harvesting machine according to claim 20 wherein the cutter bar comprises a structural wall forming part of a member onto which are attached knife guards within which the blades of each of the first and second knife bars are guided and wherein each of the drive arms extends through a respective opening in the structural wall of the cutter bar.

27. The harvesting machine according to claim 26 wherein there is provided a stiffening plate mounted onto the structural wall at each of the openings.

28. The harvesting machine according to claim 20 wherein said first and second couplings each include a downwardly extending cylindrical pin attached to the drive arm and a cup shaped receptacle for the pin mounted on the respective knife bar.

29. The harvesting machine according to claim 28 wherein each of said drive arms includes a cap portion of the drive arm carrying the pin and extending forwardly from a main body of the drive arm, the cap portion being mounted on the main body in a manner which allows height adjustment of the pin relative to the drive arm.

30. The harvesting machine according to claim 29 wherein the main body of each drive arm includes a top surface generally parallel to the knife bar and wherein the respective cap portion has a mating bottom surface screw fastened to the top surface.

31. The harvesting machine according to claim 28 wherein the receptacle is attached to the respective knife bar by an elongate connector bar which extends along the respective knife bar in both directions from the receptacle and wherein the connector bar tapers in height and the connector bar is fastened to the knife bar by plurality of screws at spaced positions therealong.

32. The harvesting machine according to claim 20 wherein the motor is mounted within the housing.

33. A harvesting machine comprising:

a cutter bar along a forward end of the harvesting machine supported on a frame;

a first sickle knife assembly supported for side to side reciprocating movement and extending from a first end of the cutter bar to a position approximately midway along the cutter bar;

the first sickle knife assembly including a reciprocating first knife bar and a plurality of knife blades side by side along the bar;

a second sickle knife assembly supported for side to side reciprocating movement along a forward end of the harvesting machine and extending from a second end of the cutter bar to said position approximately midway along the cutter bar;

the second sickle knife assembly including a reciprocating second knife bar and a plurality of knife blades side by side along the bar;

a rotary input drive member;

a first rotary member supported for rotation driven by the rotary input drive member about a generally upstanding first rotational axis;

a second rotary member supported for rotation driven by the rotary input drive member about a generally upstanding second rotational axis, which is parallel to and spaced from the first axis;

a first eccentric element connected to the first rotary member for rotation eccentrically about the first rotational axis;

a second eccentric element connected to the second rotary member for rotation eccentrically about the second rotational axis;

a first pivot shaft defining a fixed upstanding first pivot axis at a positon spaced from the first rotation axis;

a second pivot shaft defining a fixed upstanding second pivot axis at a positon spaced from the second rotation axis;

a first lever mounted for pivotal movement about the first pivot axis driven by a first drive link connected from the first lever to the first eccentric element;

a second lever mounted for pivotal movement about the second pivot axis driven by a second drive link connected from the second lever to the second eccentric element;

a first knife drive arm having a drive end connected in driving relation to the first sickle knife bar and driven in pivotal movement about the first pivot axis by the first lever so as to cause reciprocating movement of the first sickle knife bar along the cutter bar;

a second knife drive arm having a drive end connected in driving relation to the second sickle knife bar and driven in pivotal movement about the second pivot axis by the second lever so as to cause reciprocating movement of the second sickle knife bar along the cutter bar;

wherein the first and second rotary members are driven by a common drive member to rotate in the same direction about the first and second rotary axes.

* * * * *